(12) United States Patent
Weppenaar

(10) Patent No.: US 8,446,365 B2
(45) Date of Patent: May 21, 2013

(54) JOYSTICK WITH A SENSOR DEVICE

(75) Inventor: Nick Weppenaar, Copenhagen K (DK)

(73) Assignee: Sauer-Danfoss ApS, Nordborg (DK)

( * ) Notice: Subject to any disclaimer, the term of this patent is extended or adjusted under 35 U.S.C. 154(b) by 864 days.

(21) Appl. No.: 12/048,248

(22) Filed: Mar. 14, 2008

(65) Prior Publication Data

US 2008/0225002 A1  Sep. 18, 2008

(30) Foreign Application Priority Data

Mar. 16, 2007  (DK) .................................. 2007 00399

(51) Int. Cl.
  *G09G 5/08* (2006.01)
  *A63F 9/24* (2006.01)
  *A63F 13/00* (2006.01)
  *G06F 17/00* (2006.01)
  *G06F 19/00* (2011.01)
  *H01H 9/00* (2006.01)

(52) U.S. Cl.
  USPC ............. 345/161; 463/38; 335/205; 335/206; 335/207

(58) Field of Classification Search
  USPC .................................. 345/161; 335/205–207
  See application file for complete search history.

(56) References Cited

U.S. PATENT DOCUMENTS

| | | | | |
|---|---|---|---|---|
| 3,209,097 A | * | 9/1965 | Shlesinger, Jr. ................ | 335/207 |
| 5,714,980 A | | 2/1998 | Niino | |
| 5,831,554 A | | 11/1998 | Hedayat et al. | |
| 5,831,596 A | | 11/1998 | Marshall et al. | |
| 5,850,142 A | * | 12/1998 | Rountos et al. ............ | 324/207.2 |
| 5,969,520 A | | 10/1999 | Schottler | |
| 6,664,666 B2 | * | 12/2003 | Corcoran ................... | 310/12.23 |
| 6,704,001 B1 | * | 3/2004 | Schena et al. ................ | 345/161 |
| 6,724,185 B2 | | 4/2004 | Ooki et al. | |
| 2002/0149565 A1 | | 10/2002 | Sako | |
| 2003/0178901 A1 | | 9/2003 | Erten et al. | |

FOREIGN PATENT DOCUMENTS

DE  10 2005 012 883 A1  9/2006

* cited by examiner

*Primary Examiner* — Bipin Shalwala
*Assistant Examiner* — Ilana Spar
(74) *Attorney, Agent, or Firm* — McCormick, Paulding & Huber LLP

(57) ABSTRACT

A joystick (1) comprising a substantially stationary part (4) and a movable part (3) adapted to be manipulated by an operator. The joystick further comprises a sensor device adapted to detect a position of the movable part (3) relatively to the substantially stationary part (4), the sensor device comprising a magnet arrangement comprising one or more magnets (9) and defining a predetermined magnetic field, and a magnetic detector being adapted to detect a magnetic flux and to generate a corresponding output. The magnet arrangement or the magnetic detector is arranged on the substantially stationary part (4), while the magnetic detector or the magnet arrangement is arranged on the movable part (3). Thereby relative movements between the parts (3, 4) result in relative movements between the magnet arrangement and the magnetic detector. The magnet(s) (9) of the magnet arrangement is/are shaped in such a manner that an outer contour of the magnet(s) (9) substantially follows a relative angular movement between the magnet(s) (9) and the magnetic detector during manipulation of the movable part (3). Thereby a substantially linear change in output from the magnetic detector is obtained in response to a linear change in the relative position between the parts (3, 4). The magnetic detector preferably is or comprises a Hall effect sensor (10). The magnet(s) (9) may have a curved shape, e.g. a 'banana like' shape.

10 Claims, 5 Drawing Sheets

JOYSTICK WITH A SENSOR DEVICE

CROSS REFERENCE TO RELATED APPLICATION

Applicant hereby claims foreign priority benefits under U.S.C. §119 from Danish Patent Application No. PA 2007 00399 filed on Mar. 16, 2007, the contents of which are incorporated by reference herein.

FIELD OF THE INVENTION

The present invention relates to a joystick being provided with a sensor device for detecting a relative position between a movable part of the joystick and a substantially stationary part of the joystick, using a magnetic detector. The joystick according to the present invention is very suitable for use in a work utility vehicle.

BACKGROUND OF THE INVENTION

In prior art joysticks for utility work vehicles it is known to detect the relative position of a movable part of the joystick, typically being provided with a handle, and a substantially stationary part of the joystick by means of a number of ordinary bar magnets arranged on the movable part and corresponding magnetic detectors, e.g. Hall effect sensors, arranged on the stationary part. Each of the magnetic detectors detects a magnetic flux generated by the corresponding bar magnet. Since the magnetic field generated by a bar magnet varies along the length of the magnet, the detected magnetic flux reflects the relative position between the movable part and the stationary part of the joystick. An output generated by the magnetic detectors is therefore indicative of the position of the joystick.

In a joystick the movable part normally performs angular movements relatively to the stationary part. Accordingly, the magnetic detectors follow curved paths relatively to the bar magnets. These curved paths cross the magnetic field lines in such a manner that the change in magnetic flux detected by a magnetic detector is markedly non-linear in response to the distance traveled by the magnetic detector. This is particularly a problem at positions at or near a neutral position of the joystick, where relatively large angular movements of the movable part results in relatively small variations in the detected magnetic flux, thereby leading to a relatively poor angular resolution. Previously, it has been attempted to solve the problems described above by means of software compensation. However, at positions at or near the neutral position considerable software compensation is necessary. This has the adverse effect that a small change in sensor output will be translated into a larger change in angle. Since there are several tolerances, e.g. air gap, which can vary during operation this means that the angular region defined as neutral can vary significantly. This may even compromise the safety of an application having the joystick mounted therein, e.g. a vehicle. Thus, even if a joystick is not operated, it may generate and send a signal indicating that it is, and the application may thereby start moving without an operator. This is very disadvantageous and possibly hazardous.

Furthermore, the non-linearity described above also has the consequence that a relatively large number of calibration points are necessary when calibrating the sensor, because a calibration curve is normally obtained by interpolating between measured calibration points, and when the calibration curve is markedly non-linear, a large number of calibration points are necessary in order to ensure that the interpolated parts of the calibration curve give a substantially correct image of the actual relationship between the detected magnetic flux and the relative position. This is a further disadvantage, since it adds to production costs.

SUMMARY OF THE INVENTION

It is, thus, an object of the invention to provide a joystick in which the problems described above are avoided, at least to a certain extent.

It is a further object of the invention to provide a joystick in which a substantially linear change in output is obtained from a sensor device in response to a linear change in a relative position between a movable part and a stationary part of the joystick.

According to the present invention the above and other objects are fulfilled by providing a joystick comprising:
- a substantially stationary part,
- a movable part adapted to be manipulated by an operator, and
- a sensor device adapted to detect a position of the movable part relatively to the substantially stationary part, the sensor device comprising a magnet arrangement comprising one or more magnets and defining a predetermined magnetic field, and a magnetic detector being adapted to detect a magnetic flux and to generate a corresponding output, one of the magnet arrangement and the magnetic detector being arranged on the substantially stationary part, and the other of the magnet arrangement and the magnetic detector being arranged on the movable part, wherein the magnet(s) of the magnet arrangement is/are shaped in such a manner that an outer contour of the magnet(s) substantially follows a relative angular movement between the magnet(s) and the magnetic detector during manipulation of the movable part.

In the present context the term 'substantially stationary part' should be interpreted to mean a part of the joystick which is not manipulated during operation, and which is normally arranged in a stationary manner with respect to an application having the joystick mounted therein. Accordingly, the substantially stationary part does not have to be absolutely fixed, but may be allowed to move along with the application, and possibly also to perform certain movements relatively to the application. For instance, in the case that the joystick is arranged in a vehicle, the stationary part will be allowed to move along with the vehicle. As another example, the joystick may be connected to the application via a wire, the joystick thereby being movable, e.g. in order to allow an operator to move to a suitable position and use the joystick from this position. In this case the substantially stationary part is movable relatively to the application. However, in any event it is the relative movements between the substantially stationary part and the movable part which determine operation of a device being manipulated by means of the joystick.

Accordingly, the movable part is the part of the joystick which is manipulated by an operator in order to operate a relevant device.

One of the magnet arrangement and the magnetic detector is arranged on the substantially stationary part, and the other of the magnet arrangement and the magnetic detector is arranged on the movable part. This should be interpreted to mean that either the magnet arrangement or the magnetic detector is arranged on the substantially stationary part. In the case that the magnet arrangement is arranged on the substantially stationary part, the magnetic detector is arranged on the movable part. On the other hand, in the case that the magnetic detector is arranged on the substantially stationary part, the magnet arrangement is arranged on the movable part. Accordingly, the magnet arrangement and the magnetic detector perform relative movements when the movable part and the substantially stationary part perform relative movements, and the relative movements of the magnet arrangement and the magnetic detector are proportional to the relative movements of the movable part and the substantially stationary part.

The sensor device is adapted to detect a position of the movable part relatively to the substantially stationary part. Thus, when an operator manipulates the movable part, thereby causing a relative angular movement between the movable part and the substantially stationary part, and thereby a relative angular movement between the magnet arrangement and the magnetic detector as described above, the magnetic detector will detect a corresponding change in magnetic flux, and it will generate a corresponding change in output. Accordingly, a change in output is generated by the sensor device, which is indicative of the relative movement between the movable part and the substantially stationary part. It should be noted that, based on the detected relative position, it may be possible to calculate a relative velocity or acceleration.

The magnet(s) of the magnet arrangement is/are shaped in such a manner that an outer contour of the magnet(s) substantially follows a relative angular movement between the magnet(s) and the magnetic detector during manipulation of the movable part.

In the present context the term 'an outer contour' should be interpreted to mean a curve defined by an outer surface of the relevant magnet. Changing an outer contour of a magnet, e.g. from a substantially straight line to a curved line, changes the magnetic field generated by the magnet. By designing the magnets as described above it is obtained that, during manipulation of the movable part, the magnetic detector crosses the magnetic field lines in a manner which provides a substantially linear change in magnetic flux in response to the distance traveled by the magnetic detector relatively to the magnet(s). Thereby the output generated by the magnetic detector will also be substantially linear. This is very advantageous, since the need for software compensation is thereby considerably reduced, and may even be avoided. Furthermore, the problems described above relating to the angular resolution in a neutral region of the joystick are also eliminated, or at least considerably reduced. Thus, the drawbacks described above are eliminated, or at least reduced considerably.

The magnet arrangement may comprise at least one magnet defining a longitudinal axis, said magnet(s) having a curved shape along said longitudinal axis, said curved shape corresponding to the relative angular movement between the magnet(s) and the magnetic detector during manipulation of the movable part. In a joystick the relative movements between the movable part and the substantially stationary part normally involve tilting the movable part about a pivot point. Accordingly, the relative movements between the movable part and the substantially stationary part are angular. Thus, the relative movements between the magnetic detector and the magnet(s) will also be angular, and thereby the path followed by the magnetic detector relatively to a magnet will be curved. It is therefore an advantage that, according to this embodiment, at least one magnet has a curved shape.

The magnet(s) may, in this case, have a 'banana like' shape, i.e. it/they may have a longitudinal shape, the ends of the magnet(s) being bent away from the longitudinal axis. Thus, the magnet(s) may have an appearance which is similar to an ordinary bar magnet which has been bent. However, the magnet(s) is/are preferably manufactured with the curved shape, rather than being formed by bending an ordinary bar magnet. In the case that the curved shape is obtained by bending an ordinary bar magnet, this will normally involve heating the magnet to such an extent that it will be necessary to remagnetise the magnet afterwards. Therefore this manufacturing method will in most cases be less preferable than directly manufacturing the magnet with the desired shape.

Preferably, the curved shape follows a path which is described by a circular arc with an axis of rotation extending orthogonally from the vertical axis of the joystick and passing through the pivot point. However, other suitable paths may be used.

The magnet arrangement may comprise four magnets, each defining a longitudinal axis, the magnets being arranged in such a manner that they form a square or rectangle. This is very similar to the prior art joystick defined above. However, in this case the magnets all have a shape with an outer contour which substantially follows a relative angular movement between the magnets and the magnetic detector during manipulation of the movable part, e.g. defining a curved shape as described above. Alternatively, the magnet(s) may be arranged in any other suitable manner.

The magnetic detector may be or comprise at least one Hall effect sensor. In the case that the magnet arrangement comprises four magnets as described above, the magnetic detector may preferably comprise four Hall effect sensors, one for each magnet, and the sensors may be arranged in such a manner that each sensor measures the magnetic flux generated by a corresponding magnet. It is very preferred to use Hall effect sensors, since they can be acquired at a very low cost level. However, as an alternative, any other suitable kind of magnetic detector may be used, such as a magnetometer.

The movable part may be mounted on the substantially stationary part in such a manner that the movable part is pivotally movable relatively to the substantially stationary part around a pivot point. This is often the case in joysticks. However, it could be envisaged that the movable part could be mounted on the substantially stationary part in any other suitable manner, depending on the specific application.

The joystick according to the present invention may advantageously be mounted in or form part of a utility work vehicle, such as an excavator, a truck, etc. For instance, the joystick according to the invention may be used for operating various kinds of hydraulic applications of such a vehicle, such as hydraulic valves, e.g. of the kind used for steering the vehicle or for operating transmission systems of the vehicle.

Thus, the present invention also relates to a utility work vehicle comprising a joystick according to the invention.

BRIEF DESCRIPTION OF THE DRAWINGS

The invention will now be described in further detail with reference to the accompanying drawings in which.

DETAILED DESCRIPTION OF THE PREFERRED EMBODIMENTS

Figure 1:
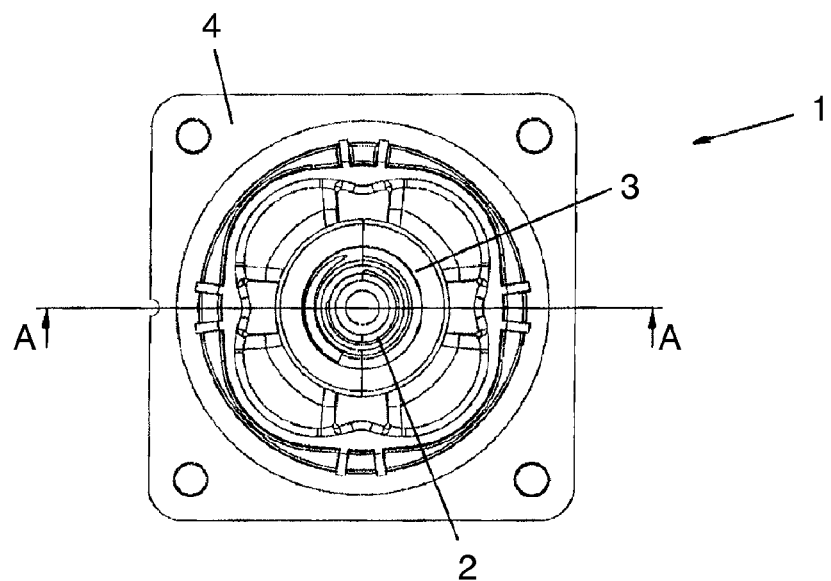
FIG. 1 is a top view of a joystick according to an embodiment of the invention.

FIG. 1 is a top view of a joystick 1 according to an embodiment of the invention. The joystick 1 comprises a handle 2 arranged on a movable part 3 being pivotally mounted on a substantially stationary part 4. An operator may, thus, perform pivotal movements of the movable part 3 relatively to the substantially stationary part 4 by moving the handle 2. This will be explained further below.

Four magnets (not visible) are mounted on the movable part 3 and four Hall effect sensors (not visible) are mounted on the substantially stationary part 4. Each of the Hall effect sensors is thereby capable of detecting magnetic flux generated by one of the magnets. This will also be described in further detail below.

Figure 2:
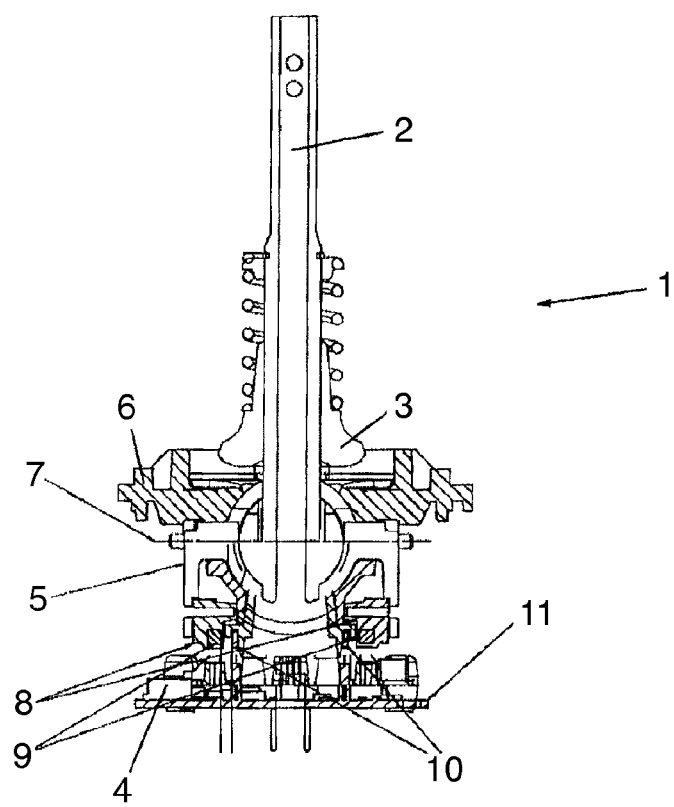
FIG. 2 is a cross sectional view of the joystick of FIG. 1 along the line A-A.

FIG. 2 is a cross sectional view of the joystick 1 of FIG. 1 along the line A-A shown in FIG. 1. From FIG. 2 it clearly appears that the handle 2 protrudes from the movable part 3 in a substantially upwards direction. The movable part 3 is provided with a lower yoke 5 extending below an upper part 6 of the substantially stationary part 4. The movable part 3 is adapted to pivot about pivot line 7. A similar pivot line (not visible) is arranged substantially perpendicularly to the pivot line 7. Thereby the movable part 3 is allowed to pivot in two directions relatively to the substantially stationary part 4.

On magnet holders 8 of the movable part 3 there are mounted four magnets 9, two of which are visible in FIG. 2. The magnets 9 have a curved shape which will be described in further detail below with reference to FIG. 6.

On the substantially stationary part 4 there are mounted four Hall effect sensors 10. The Hall effect sensors 10 are mounted in such a manner that each Hall effect sensor 10 faces a magnet 9, and thereby each of the Hall effect sensors 10 is adapted to detect magnetic flux generated by one of the magnets 9. Furthermore, the Hall effect sensors 10 are adapted to generate an output in response to a detected magnetic flux. Since the magnetic flux generated by a magnet varies as a function of the position relatively to the magnet, the output generated by the Hall effect sensors 10 indicates the angular position of the movable part 3 relatively to the substantially stationary part 4, in relation to both of the pivot axes 7.

Below the substantially stationary part 4 there is arranged a printed circuit board (PCB) assembly 11. This is used for collecting the output generated by each of the Hall effect sensors 10.

Figure 3:
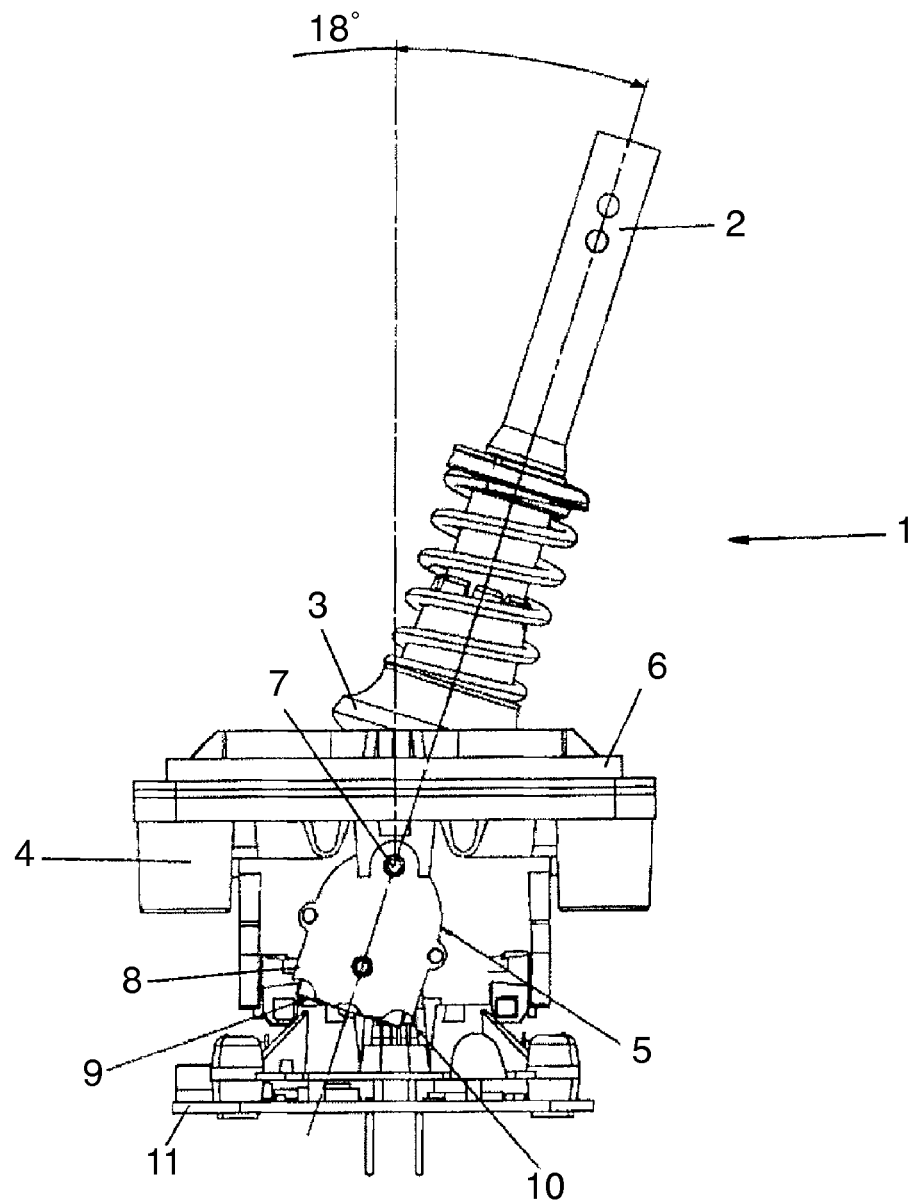
FIG. 3 is a side view of the joystick of FIGS. 1 and 2.

FIG. 3 is a side view of the joystick 1 of FIGS. 1 and 2. The movable part 3 of the joystick 1 of FIG. 3 is tilted 18° around pivot axis 7. The movable part 3 has been moved to this position by an operator manipulating the handle 2. It is clear that the magnets 9 thereby perform angular movement relatively to the Hall effect sensors 10.

Figure 4:
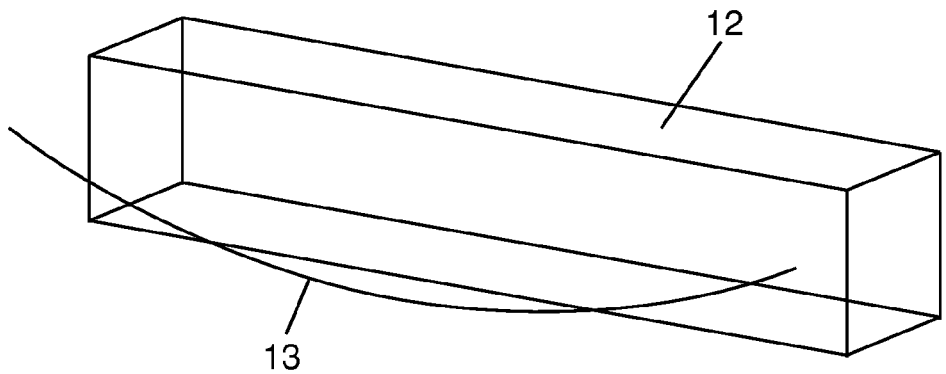
FIG. 4 is a perspective view of a magnet for use in a prior art joystick.

FIG. 4 is a perspective view of an ordinary bar magnet 12 for use in a prior art joystick 1. FIG. 4 shows the trajectory 13 followed by a Hall effect sensor relatively to the magnet 12 during relative angular movements between a movable part and a substantially stationary part of the joystick. It is clear that the shape of the bar magnet 12, in particular its outer contour, is significantly different from the trajectory 13.

Figure 5:
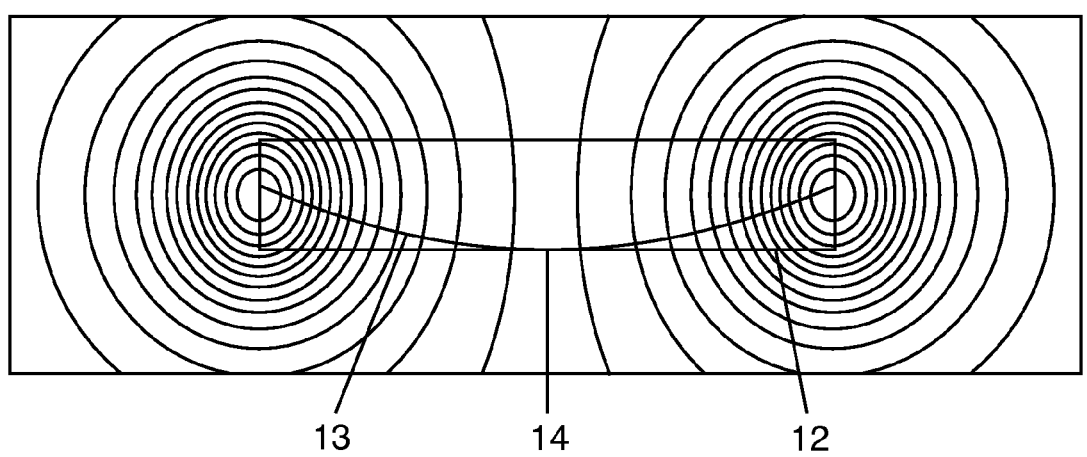
FIG. 5 is a contour plot of the magnetic field generated by the magnet of FIG. 4.

FIG. 5 is a contour plot of the out-of-plane component of the magnetic field generated by the magnet 12 of FIG. 4, in the plane defined by the trajectory 13. The trajectory 13 of the Hall effect sensor is also indicated. In the contour plot, each of the lines represents a given level of field strength of the magnetic field. The levels are equally spaced with regard to magnetic field strength, i.e. the variation in magnetic field strength between neighbouring lines is the same throughout the plot. Accordingly, closely spaced lines indicate rapid variations in field strength, while lines having a somewhat longer distance there between indicate a more slowly varying field.

It is clear from FIG. 5 that, when following the trajectory 13 of the Hall effect sensor, the contour lines are crossed in such a manner that the variation in field strength is a non-linear function of the distance traveled. In particular, the field strength varies very slowly near a neutral position 14 of the joystick. Accordingly, an output generated by the Hall effect sensor in response to a detected magnetic flux will vary non-linearly with respect to the traveled distance. Thereby the disadvantages described above occur.

Figure 6:
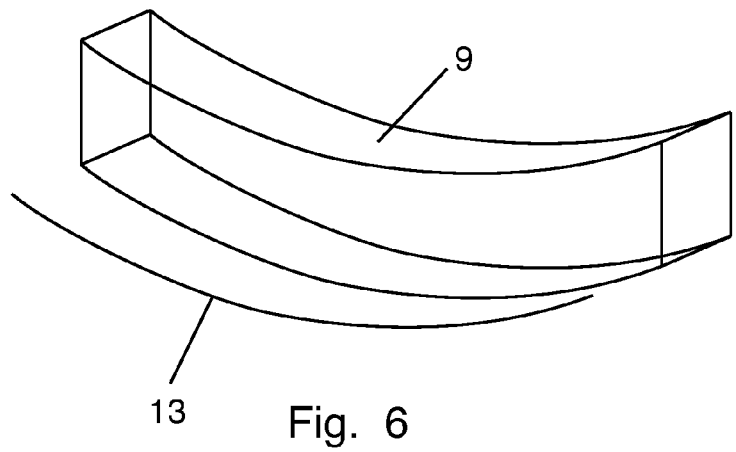
FIG. 6 is a perspective view of a magnet for use in a joystick according to an embodiment of the invention.

FIG. 6 is a perspective view of a magnet 9 for use in a joystick according to an embodiment of the invention. An outer contour of the magnet 9, e.g. the upper or the lower surface of the magnet 9, is curved. The trajectory 13 followed by a Hall effect sensor is also shown. It is clear from FIG. 6 that the curvature of the upper/lower side substantially follows the trajectory 13.

Figure 7:
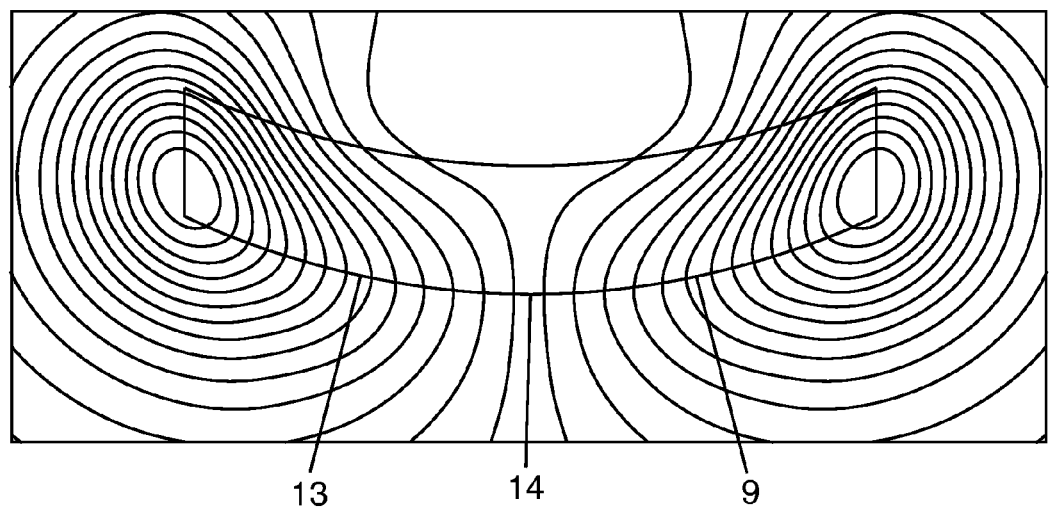
FIG. 7 is a contour plot of the magnetic field generated by the magnet of FIG. 6.

FIG. 7 is a contour plot of the out-of-plane component of the magnetic field generated by the magnet 9 of FIG. 6, in the plane defined by trajectory 13. It is clear from FIG. 7 that, when following a trajectory 13 of the Hall effect sensor which is coinciding with the lower surface of the magnet 9, the contour lines are crossed in such a manner that the variation in field strength is a substantially linear function of the distance traveled, even near the neutral position 14. Accordingly, an output generated by the Hall effect sensor in response to a detected magnetic flux will vary substantially linearly with respect to the traveled distance. As explained above, this is very advantageous.

Figure 8:
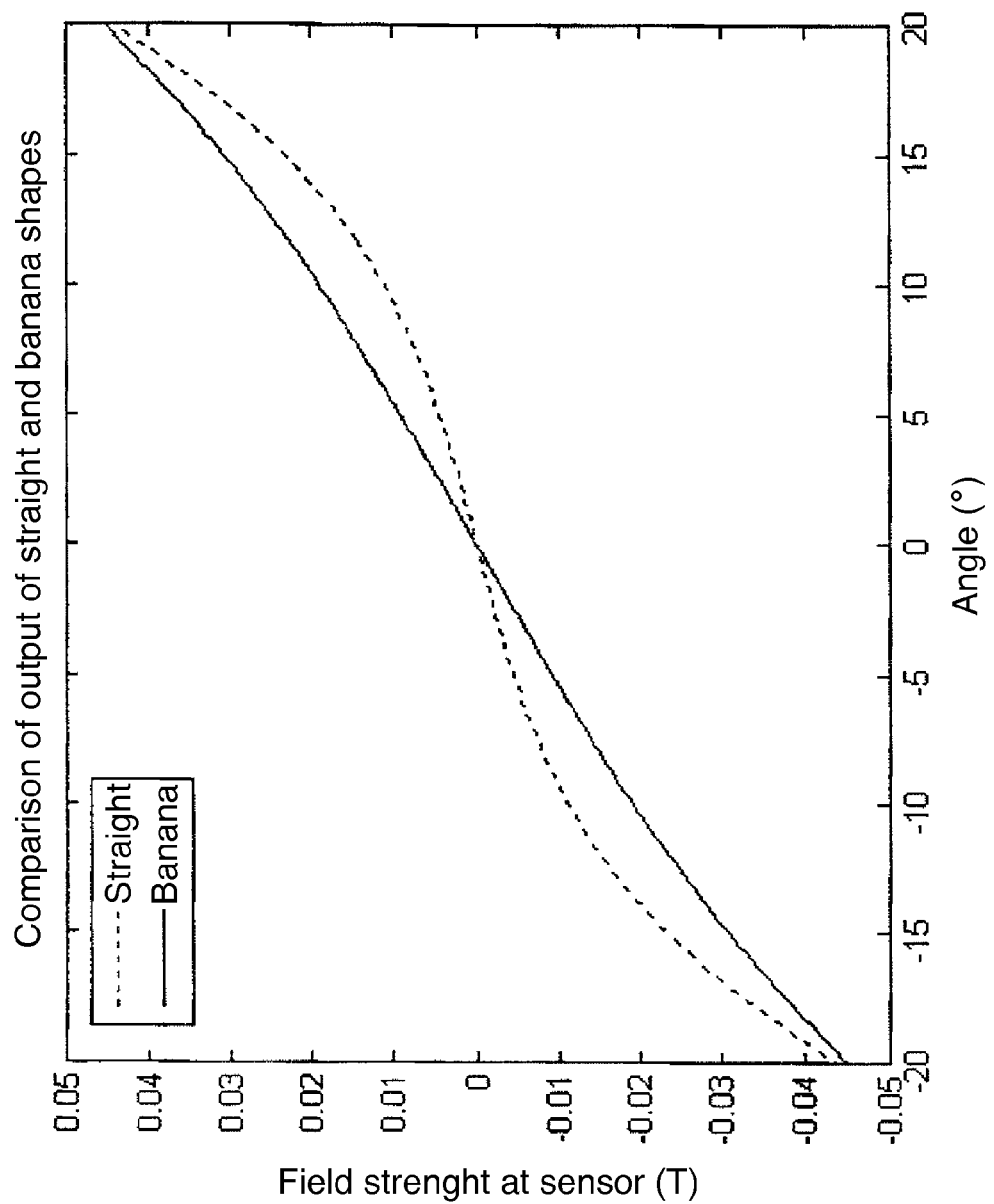
FIG. 8 is a comparison plot of field strength at a sensor as a function of angle for a prior art joystick and a joystick according to an embodiment of the invention, respectively.

FIG. 8 is a comparison plot of field strength at a sensor as a function of angle for a prior art joystick, e.g. comprising magnets of the kind shown in FIG. 4, and a joystick according to an embodiment of the invention, e.g. comprising magnets of the kind shown in FIG. 6, respectively. The solid line represents the joystick according to the invention, and the dotted line represents the prior art joystick. It is very clear from the plot that the variation in field strength in response to tilt angle is much more linear for the joystick according to the invention than for the prior art joystick.

While the present invention has been illustrated and described with respect to a particular embodiment thereof, it should be appreciated by those of ordinary skill in the art that various modifications to this invention may be made without departing from the spirit and scope of the present invention.

What is claimed is:
1. A joystick comprising:
a substantially stationary part,
a movable part adapted to be manipulated by an operator, and
a sensor device adapted to detect a position of the movable part relatively to the substantially stationary part, the sensor device comprising a magnet arrangement comprising one or more magnets and defining a predetermined magnetic field, and a magnetic detector being adapted to detect a magnetic flux and to generate a corresponding output, one of the magnet arrangement and the magnetic detector being arranged on the sub- stantially stationary part, and the other of the magnet arrangement and the magnetic detector being arranged on the movable part, the magnet(s) of the magnet arrangement having a shape comprising two opposing sides that are curved along the longitudinal axis such that the ends of the magnet(s) are bent away from the longitudinal axis and such that an outer contour of the magnet(s) substantially follows a relative angular movement between the magnet(s) and the magnetic detector during manipulation of the movable part, whereby the magnetic detector generates an output that is a substantially linear function of the relative movement between the magnet(s) and the magnetic detector.

2. The joystick according to claim 1, wherein the magnet arrangement comprises four magnets, each defining a longitudinal axis, the magnets being arranged in such a manner that they form a square or rectangle.

3. The joystick according to claim 1, wherein the magnetic detector is or comprises at least one Hall effect sensor.

4. The joystick according to claim 1, wherein the movable part is mounted on the substantially stationary part in such a manner that the movable part is pivotally movable relatively to the substantially stationary part about a pivot point.

5. A utility work vehicle comprising a joystick according to claim 1.

6. A joystick comprising:
a substantially stationary part;
a movable part adapted to be manipulated by an operator; and
a sensor device adapted to detect a position of the movable part relative to the substantially stationary part, the sensor device comprising:

a magnet arrangement comprising one or more magnets and defining a predetermined magnetic field, and
a magnetic detector being adapted to detect a magnetic flux and to generate a corresponding output,
wherein one of the magnet arrangement and the magnetic detector is arranged on the substantially stationary part, and the other of the magnet arrangement and the magnetic detector is arranged on the movable part,
wherein the magnet(s) of the magnet arrangement is/are square bar magnet(s) defining a longitudinal axis, the magnet(s) comprising two parallel opposing sides that are curved along the longitudinal axis such that the magnet(s) has/have a curved shape along the longitudinal axis that substantially follows a relative angular movement between the magnet(s) and the magnetic detector during manipulation of the movable part,
whereby the magnetic detector generates an output that is a substantially linear function of the relative movement between the magnet(s) and the magnetic detector.

7. The joystick according to claim 6, wherein the magnet arrangement comprises four magnets, each defining a longitudinal axis, the magnets being arranged in such a manner that they form a square or rectangle.

8. The joystick according to claim 6, wherein the magnetic detector is or comprises at least one Hall effect sensor.

9. The joystick according to claim 6, wherein the movable part is mounted on the substantially stationary part in such a manner that the movable part is pivotally movable relatively to the substantially stationary part about a pivot point.

10. A utility work vehicle comprising a joystick according to claim 6.

* * * * *